United States Patent [19]

Train

[11] Patent Number: 4,676,739
[45] Date of Patent: Jun. 30, 1987

[54] PRE-EXPANDER FOR EXPANDABLE POLYMER BEADS

[76] Inventor: Ian C. Train, 9 Salisbury Avenue, Kenridge, Durbanville, Cape Province, South Africa

[21] Appl. No.: 838,137

[22] Filed: Mar. 10, 1986

[30] Foreign Application Priority Data

Mar. 11, 1985 [ZA] South Africa ............... 85/1804

[51] Int. Cl.⁴ .............................. F27B 9/40
[52] U.S. Cl. .................... 432/34; 432/118; 432/103; 361/33; 425/209; 318/433
[58] Field of Search ............ 264/DIG. 9, 40.1; 521/58; 425/4 R, 209; 432/34, 103, 112, 118; 361/33; 318/433

[56] References Cited

U.S. PATENT DOCUMENTS 3,720,004  3/1973  Okawara ............... 34/134
3,798,789  3/1974  Thompson ............ 432/103
3,811,822  5/1974  Cherenson ............ 432/118
4,031,440  6/1977  Christian et al. ..... 318/433
4,060,354  11/1977 Smith .................. 425/209
4,112,475  9/1978  Stitt et al. ............ 361/33
4,118,749  10/1978 Matuzaki et al. ..... 361/33

Primary Examiner—Henry C. Yuen
Attorney, Agent, or Firm—Fitch, Even, Tabin & Flannery

[57] ABSTRACT

A pre-expander for polymer beads is disclosed which includes a pre-expansion chamber having an agitator therein. The agitator is driven by an electric motor. The power requirements of the motor are monitored to determine the resistance which the beads are offering to motion of the agitator. The resistance to motion increases as the beads expand. Pre-expansion is stopped when the resistance offered by the beads results in a predetermined power requirement.

10 Claims, 4 Drawing Figures

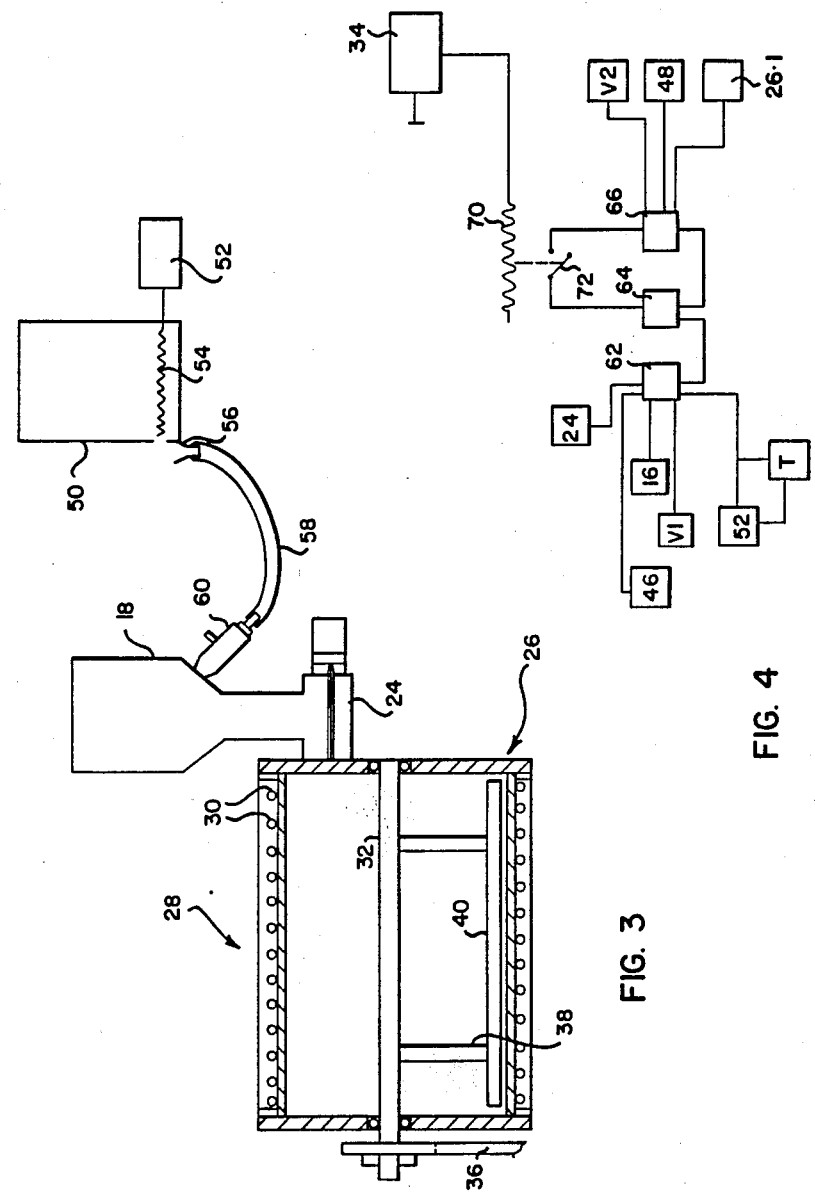

PRE-EXPANDER FOR EXPANDABLE POLYMER BEADS

BACKGROUND TO THE INVENTION

Before feeding expandable polymer beads to moulds in which light weight articles such as cups are made, the polymer beads are heated so as to pre-expand them. Conventionally they are then temporarily held in a hopper prior to being fed to the moulds for final expansion.

The beads (which are usually polystyrene) contain a hydrocarbon blowing agent which reaches its boiling point during the time that the beads are within the pre-expansion chamber. The blowing agent vaporises and applies pressure within the heat softened bead walls to expand the beads in what has become known in the art as the pre-expansion stage.

Various pre-expansion methods are known. Steam pre-expansion on a continuous basis or on a batch basis is known but both these methods have the singular disadvantage of requiring a maturity period of at least four hours in order to stabilise cellular pressure within the beads prior to using them for moulding. This system uses direct contact between the steam heating medium and the expandable beads. Because of the maturity period that is required, a steam system requires large hoppers in which the beads can be accommodated while maturing.

An alternative pre-expansion system is that known as dry pre-expansion. In this system the expandable beads are not in direct contact with the heating medium but are pre-expanded by indirect contact with the heating medium through the use of heated cylinder walls. The advantage of this system is that the beads do not need to be matured prior to moulding. Systems of this type are described in U.S. Pat. Nos. 4,060,354 and 3,577,360. The systems described in these two patents use an enclosed heated cylinder in which the beads remain for a fixed time period. In these systems the temperature of the heating medium and the mass of the 'shot' of beads charged into the pre-expansion chamber is uniform. The fixed time period during which pre-expansion takes place cannot maintain accurate control of final density. The major reason why the systems of these two prior patents fail to produce pre-expanded beads of uniform density is that the unexpanded beads are not themselves uniform. Firstly, the amount of blowing agent in the beads can vary from bead to bead due to inconsistencies during manufacture of loss of blowing agents subsequent to manufacture. Secondly, and to a more limited degree, there may be size variations in the polymer beads in a particular container, and thirdly the beads in a particular container may be segregated by size.

Because of the inconsistencies referred to, it is unsatisfactory to dry pre-expanded beads for a fixed period of time. These inconsistencies are such that the finished article may have a mass which is anything up to 20% more or less than is desired.

OBJECT OF THE PRESENT INVENTION

The main object of the present invention is to provide a pre-expander which will produce beads of uniform density.

BRIEF DESCRIPTION OF THE INVENTION

According to one aspect of the present invention there is provided a pre-expander for expandable polymer beads, the pre-expander comprising a heated pre-expansion chamber for receiving unexpanded beads, means for heating said chamber, an agitator within the pre-expansion chamber, an electric motor for driving the agitator, means for detecting the increase in the power requirement of the motor which occurs as the beads expand and offer more resistance to movement of the agitator, and means for discharging pre-expanded beads from said chamber, the detecting means, upon detecting a power requirement increase of pre-determined magnitude, activating the discharging means thereby to cause the pre-expanded beads to be discharged from the pre-expansion chamber.

It is preferred that the current drawn by the motor be monitored e.g. by a relay the contacts of which are activated when the current flowing through the coil increases to a predetermined level.

Said chamber can comprise a cylinder arranged with its axis horizontal, said agitator including a shaft co-axial with the cylinder and a radial arm extending outwardly from the shaft, there being a stirrer element at the outer end of said arm.

The cylinder can be heated by steam coils, electric heating elements, or a steam jacket, and there can be a temperature control system for maintaining the temperature of the cylinder at the desired level.

The pre-expander can further include a chamber for holding a pre-determined volume of unexpanded beads, means for feeding lubricant to the holding chamber, and means for discharging the mixed beads and lubricant from the holding chamber into said pre-expansion chamber.

The means for feeding a lubricant to the holding chamber can comprise a container for lubricant, and a worm driven by an electric motor.

A hopper can be provided for receiving pre-expanded beads from said pre-expansion chamber, the hopper including a level sensor for detecting when the beads in the hopper exceed a predetermined level.

The pre-expander can include means for charging unexpanded beads into said pre-expansion chamber, said level sensor being connected to such charging means whereby upon the level sensor detecting that the level of pre-expanded beads in the hopper exceeds the predetermined level, it interrupts operation of the charging means until the level of pre-expanded beads in the hopper has dropped below said predetermined level.

The pre-expander can further comprise a first sensor for detecting the presence of unexpanded beads in the holding chamber, and a second sensor for detecting the presence of unexpanded beads in the passage along which unexpanded beads flow from the holding chamber to the pre-expansion chamber.

According to a further aspect of the present invention there is provided a method of pre-expanding polymer beads which comprises feeding the beads into a pre-expansion chamber, heating the chamber, agitating the beads in the chamber and monitoring the power requirements of the agitator to determine when the beads have pre-expanded to the desired extent.

BRIEF DESCRIPTION OF THE DRAWINGS

For a better understanding of the present invention, and to show how the same may be carried into effect, reference will now be made, by way of example, to the accompanying drawings in which:

FIG. 3 is a diagrammatic representation of part of the pre-expander of FIGS. 1 and 2; and FIG. 4 is a diagram of the layout of the controls.

DETAILED DESCRIPTION OF THE DRAWINGS

Figure 1:
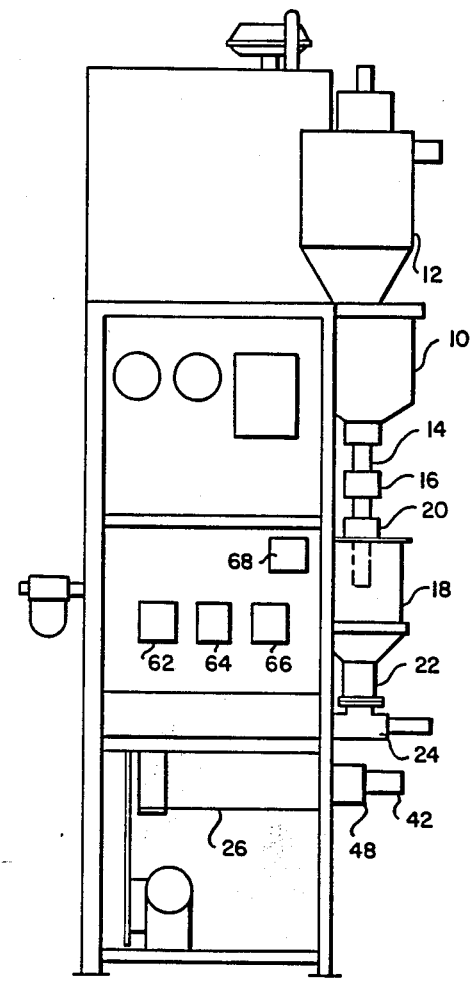
FIG. 1 is a diagrammatic front elevation of a pre-expander for preparing expandable polymer beads for moulding.
Figure 2:
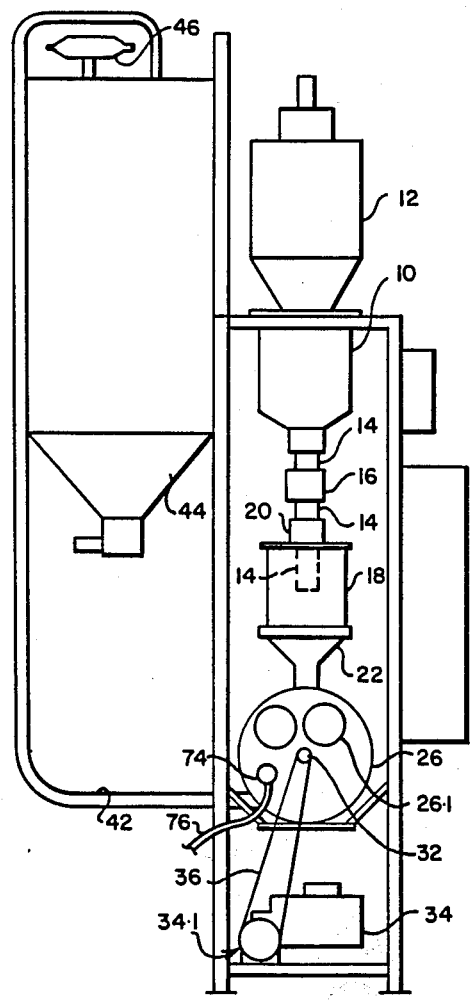
FIG. 2 is a side elevation of the pre-expander of FIG. 1.

Referingg firstly to FIGS. 1 and 2, the pre-expander illustrated comprises a hopper 10 above which there is an automatic loader 12 for keeping the hopper 10 full of unexpanded polymer beads. Below the hopper 10 is a vertical tube 14 having a shut-off valve 16 therein. The tube 14 extends downwardly into a holding chamber 18. Reference numeral 20 designates a mechanism by means of which the depth of penetration of the tube 14 into the chamber 18 can be adjusted. As will be understood more fully hereinafter, the depth of penetration of the tube 14 into the chamber 18 controls the size of the 'shot' of unexpanded pellets which is handled by the pre-expander.

The automatic loader 12 can include a suction hose (not shown) for drawing beads from a drum, carton or other source of supply and depositing them in the hopper 10. A level sensor (not shown) is provided in the hopper 10 for controlling operation of the automatic loader 12.

The outlet from the holding chamber 18 is at the lower end thereof and is designated 22, the outlet 22 leading downwardly to a valve 24. The valve 24 controls flow of beads into an expansion chamber 26 and comprises a continuously open inlet in the top thereof to which inlet the outlet 22 is connected. The valve also comprises an outlet which leads into the chamber 26 and valve head which normally closes the valve outlet. There is an air supply through the valve head. The valve head is mounted on an operating rod.

The expansion chamber 26 is illustrated in more detail in FIG. 3. This chamber is in the form of a horizontal cylinder comprising a cylindrical wall and two end plates. The cylindrical wall is surrounded by a jacket 28 within which there are electrical heating elements or, as illustrated, steam pipes 30. In an alternative form steam is supplied directly to the jacket 28.

An agitator shaft 32 is co-axial with the cylindrical wall of the expansion chamber 26, the shaft 32 passing through one end wall of the expansion chamber and being connected to a continuously running electric motor 34 (see FIG. 2) by means of a gear box 34.1 and a drive belt 36. Arms 38 extend radially outwardly from the shaft 32 and there is a stirrer blade 40 at the radially outer ends of the arms 38. The stirrer blade 40 is close to the inner face of the cylindrical wall of the expansion chamber. If desired more than one set of arms 38 and more than one blade 40 can be provided. Alternatively a single arm located mid-way between the end plates of the chamber can be provided with the stirrer blade 40 protruding axially in both directions from the single arm.

An outlet pipe 42 extends from close to the bottom of the expansion chamber 26 and then upwardly to enter a storage hopper 44. The hopper 44 includes a level sensor 46 which detects the level of pre-expanded beads stored in the hopper 46. Communication between the chamber 26 and the pipe 42 is controlled by a valve 48.

Reverting now to FIG. 3, the container designated 50 serves to store lubricant in particulate form. The lubricant used is generally zinc stearate, 0.05 to 0.1% by mass of the lubricant being added to the beads in the measuring chamber 18. More specifically, an electric motor 52 serves to drive a worm 54 which discharges lubricant from the container 50 into an upwardly open funnel 56. The lower end of the funnel communicates with a pipe 58 in which there is a venturi 60. The pipe 58 connects to the throat of the venturi so that when air is blown through the venturi into the measuring chamber 18, a low pressure is created in the pipe 58 and at the funnel 56 which low pressure sucks lubricant into the venturi and thence into the measuring chamber 18.

In FIG. 1, reference numerals 62, 64 and 66 indicate timers and reference numeral 68 indicates a temperature control. The timer 62 is connected to the valves 16 and 24, and to the valve (only shown in FIG. 4 and designated V1) which controls air supply to the venturi 60, and to the motor 52. The timers 64 and 66 are interlocked as will be described in more detail hereinafter. The temperature control 68 is set so that the temperature of the cylindrical wall of the expansion chamber 26 does not rise above the desired level.

The current being drawn by the motor 34 is monitored by a trip current relay 70, the contacts 72 of which are connected between the timers 64 and 66.

In use of the pre-expander, expandable beads drop from the hopper 10 into the measuring chamber 18. The measuring chamber 18 fills until the unexpanded beads piling up in the measuring chamber effectively close-off the lower end of the tube 14. Normally the valve 16 is open to permit beads to fall into the chamber 18 and the valve 24 is closed to prevent the beads reaching the chamber 26. It will be understood that filling of the chamber 18 with the next 'shot' of beads to be expanded occurs while pre-expansion of the previous shot of beads is taking place.

To initiate the charging cycle, the timer 62 closes the valve 16 and displaces the valve head of the valve 24 so that communication is established between the chambers 18 and 26. Air is supplied through the valve head so that pellets are swept by the air flowing through the valve into the chamber 26. Simultaneously the valve V1 is opened which permits air to flow to the venturi 60 and the motor 52 is started. The motor 52 is activated for a period of time which is commensurate with the charge of unexpanded beads which has been fed into the measuring chamber 18. After the motor 52 has been run for the required period of time e.g. three seconds, which means that a measured quantity of zinc stearate has been fed into the funnel 56, and sucked into the chamber 18, a subsidiary timer T (FIG. 4) shuts-off the motor 52. Initiation of the timer period of the timer T occurs as the timer 62 starts the motor 52. Air continues to flow to the venturi 60. After a period of time sufficient to blow all the beads into the chamber 26, the timer 62 closes the air supply valve VI, opens the valve 16, closes the valve 24 and shuts off air supply to the valve 24.

The agitator shaft 32 is continuously driven by the motor 34 and the current being drawn by the motor is monitored by the relay 70. The scraper blade 40 lifts the beads from the bottom of the expansion chamber 26, wipes them over the wall of the expansion chamber, and then drops them back to the bottom of the chamber. Gases escaping from the beads are vented through the valve designated 26.1 in FIG. 2, low pressure air being supplied to the chamber 26 to flush it during pre-extension.

The timer 64 commences its timing cycle upon the timer 62 closing the valve 24, opening the valve 16 etc. which means that the charge of beads is in the pre-expansion chamber. If it is known that the requisite expansion time is, say, 5 minutes, then the timer 64 is set for ten minutes. As the beads expand, they eventually fill about 90% of the volume of the expansion chamber and increasingly resist rotary motion of the arms 38 and blade 40. This causes the current being drawn by the motor 34 to increase. The relay 70 is set to operate when the motor current increases above a predetermined level. When the relay 70 operates, a timer cycle under the control of the timer 66 commences. When operation of the timer 64 ceases, the valve 48 is opened placing the interior of the expansion chamber 26 in communication with the hopper 44. Then vent valve 26.1 closes and a further valve (not shown in FIGS. 1 and 2 but shown as V2 in FIG. 4) causes purging air under pressure to be supplied to the expansion chamber 26, this entraining the pre-expanded beads and carrying them to the hopper 44. The timer 66 maintains this condition for, say, twenty five seconds which is sufficient to convey all the pre-expanded beads to the hopper 44. At the end of this period, the supply of bead-entraining air to the chamber 26 ceases as the valve V2 closes, and the valve 48 closes and the vent valve 26.1 re-opens. Simultaneously, the timer 62 is activated to initiate a new charge cycle provided that it is not overridden by a signal from sensor 46 indicating that the hopper 44 is full.

If the level sensor 46 indicates that there is a sufficient quantity of pre-expanded beads in the hopper 44, the timer 62 becomes inoperative which means that the valve 16 does not open and no charge of unexpanded beads is loaded into the expansion chamber 26. Likewise the motor 52 does not run. However, the timers 64 and 66 continue their normal cycle. Because there is no charge in the expansion chamber, the contacts 72 will obviously not close as the current being drawn by the motor will not increase. Timer 64 consequently runs for the time for which it has been set and then initiates the opening of the valve 48 and the supply of discharging air even though the expansion chamber 26 is empty. The sequence described above then continues and, on the assumption that the level of pre-expanded beads in the hopper 44 has dropped sufficiently, the cycle will repeat itself but this time a charge will be loaded into the expansion chamber.

Control of the density of the beads is achieved by increasing or decreasing the charge of polymer beads introduced into the expansion chamber. If a lesser charge is introduced, then the beads will have to expand further before the agitator motor 34 is overloaded. Thus the final density is lower. If a larger charge of beads is fed to the expansion chamber, then the beads will have to expand less before they occupy about 90% of the expansion chamber volume and cause a detectable overload condition on the motor 34.

The upper part of the hopper 44 can include a mesh and an agitator to screen out, and then break up, any beads which, during pre-expansion, have adhered to one another.

When a shot of beads is first charged into the chamber 26, there can be short-lived but significant cyclical increases in the current drawn by the motor 34. This is due to the fact that the blade 40 periodically dips into the un-expanded 'heavy' beads lying in the bottom of the chamber 26 and its motion is resisted. This causes peaks in the current being drawn by the motor. The motor current drops to a steady level as soon as the beads have expanded somewhat. To avoid such current increases operating the relay 70 and activating the contacts 72, it is possible to initiate current monitoring only after a suitable delay. For example, if it is known that pre-expansion time is about four minutes, then current monitoring can be initiated after, say, $2\frac{1}{2}$ minutes.

To avoid the build-up of a static electrical charge as the beads are agitated, a small amount of water can be injected into the chamber 26. The 'steamy' atmosphere that results inhibits the build-up of a static charge. A water injector is diagrammatically shown at 74 in FIG. 2 and the water feed hose leading thereto at 76.

The valve 24 is, in an alternative construction, replaced by a chute controlled by a gate. It is the gate which is withdrawn by the timer 62 to initiate the charging cycle. Air can, if desired, be blown into the chute to assist the flow of pellets from the chamber 18, down the chute and into the chamber 26. It is also possible to blow air down this chute and into the chamber 26 during discharge. Such air serves to blow towards the outlet of the chamber 26 any pre-expanded pellets which may be in the entrance constituted by the chute.

In a further modification the funnel 56, the pipe 58 and the venturi 60 are omitted and the screw 54 feeds lubricant directly into the chamber 18. There is a valve in the passage between the screw 54 and the chamber 18. When the valve 16 opens, there is a rush of pellets into the chamber 18. While not airtight, the chamber 18 is sufficiently well closed for the incoming pellets to cause a pressure increase in the chamber 18. Only after a period of time sufficient for this over pressure to dissipate is the valve between the screw 54 and the chamber 18 opened, and the screw 54 driven. After the time period set on timer T, elapses the valve re-closes and the screw 54 stops.

The level sensor in the hopper 10 can be omitted and replaced by a level sensor in the holding chamber 18. The sensor then detects that the desired slot of unexpanded beads is in the holding chamber. The sensor moves vertically with the tube 14. A further sensor can be provided between the chamber 18 and the valve 24. This sensor is thus in the passage along which unexpanded beads flow from the holding chamber 18 to the pre-expansion chamber 26. This further sensor detects that there are no unexpanded beads present in this passage after the shot has been charged into the chamber 26. The presence of beads in this passage at this time would indicate that only partial charging of the chamber 26 has taken place.

I claim:

1. A pre-expander for expandable polymer beads, the pre-expander comprising a heated pre-expansion chamber for receiving unexpanded beads, means for heating said chamber, an agitator within the pre-expansion chamber, an electric motor for driving the agitator, means for detecting the increase in the power requirement of the motor which occurs as the beads expand and offer more resistance to movement of the agitator, and means for discharging pre-expanded beads from said chamber, the detecting means, upon detecting a power requirement increase of pre-determined magnitude, activating the discharging means thereby to cause the pre-expanded beads to be discharged from the pre-expansion chamber.

2. A pre-expander according to claim 1, wherein said detecting means monitors the current drawn by the motor.

3. A pre-expander according to claim 1, in which said chamber comprises a cylinder arranged with its axis horizontal, said agitator including a shaft co-axial with the cylinder and a radial arm extending outwardly from the shaft, there being a stripper element at the outer end of said arm.

4. A pre-expander according to claim 1, which further comprises a holding chamber for holding a pre-determined volume of unexpanded beads, means for feeding lubricant to the holding chamber and means for discharging the mixed beads and lubricant from the holding chamber into said pre-expansion chamber.

5. A pre-expander according to claim 4, in which said means for feeding a lubricant into the holding chamber comprises a container for lubricant, and a worm driven by an electric motor.

6. A pre-expander according to claim 1 and further comprising a hopper for receiving pre-expanded beads from said pre-expansion chamber, the hopper including a level sensor for detecting when the beads in the hopper exceed a predetermined level.

7. A pre-expander according to claim 6, and including means for charging unexpanded beads into said pre-expansion chamber, and said level sensor being connected to such charging means whereby upon the level sensor detecting that the level of pre-expanded beads in the hopper exceeds the pre-determined level, it interrupts operation of the charging means until the level of pre-expanded beads in the hopper has dropped below said predetermined level.

8. A pre-expander according to claim 1, and including means for injecting water into said pre-expansion chamber.

9. A pre-expander according to claim 1, and including timing means for maintaining the power detecting means inoperative for a timed period after a charging of the chamber with unexpanded beads.

10. A pre-expander according to claim 4, and which comprises a first sensor for detecting the presence of unexpanded beads in the holding chamber, and a second sensor for detecting the presence of unexpanded beads in the passage along which unexpanded beads flow from the holding chamber to the pre-expansion chamber.

* * * * *

UNITED STATES PATENT AND TRADEMARK OFFICE
CERTIFICATE OF CORRECTION

PATENT NO. : 4,676,739
DATED : June 30, 1987
INVENTOR(S) : Ian C. Train

It is certified that error appears in the above-identified patent and that said Letters Patent is hereby corrected as shown below:

Colum 3, Line 12, change "Referingg" to --Referring--.

Line 38, after "and" insert --a--.

Column 4, Line 26, after "70" insert --(Figure 4)--.

Line 59, change "VI" to --V1--.

Column 5, Lines 1-2, change "pre-extension" to --pre-expansion--.

Claim 7, Column 8, Line 3, after "chamber," delete "and".

Signed and Sealed this

Twentieth Day of October, 1987

*Attest:*

DONALD J. QUIGG

*Attesting Officer*  *Commissioner of Patents and Trademarks*